Patented June 21, 1938

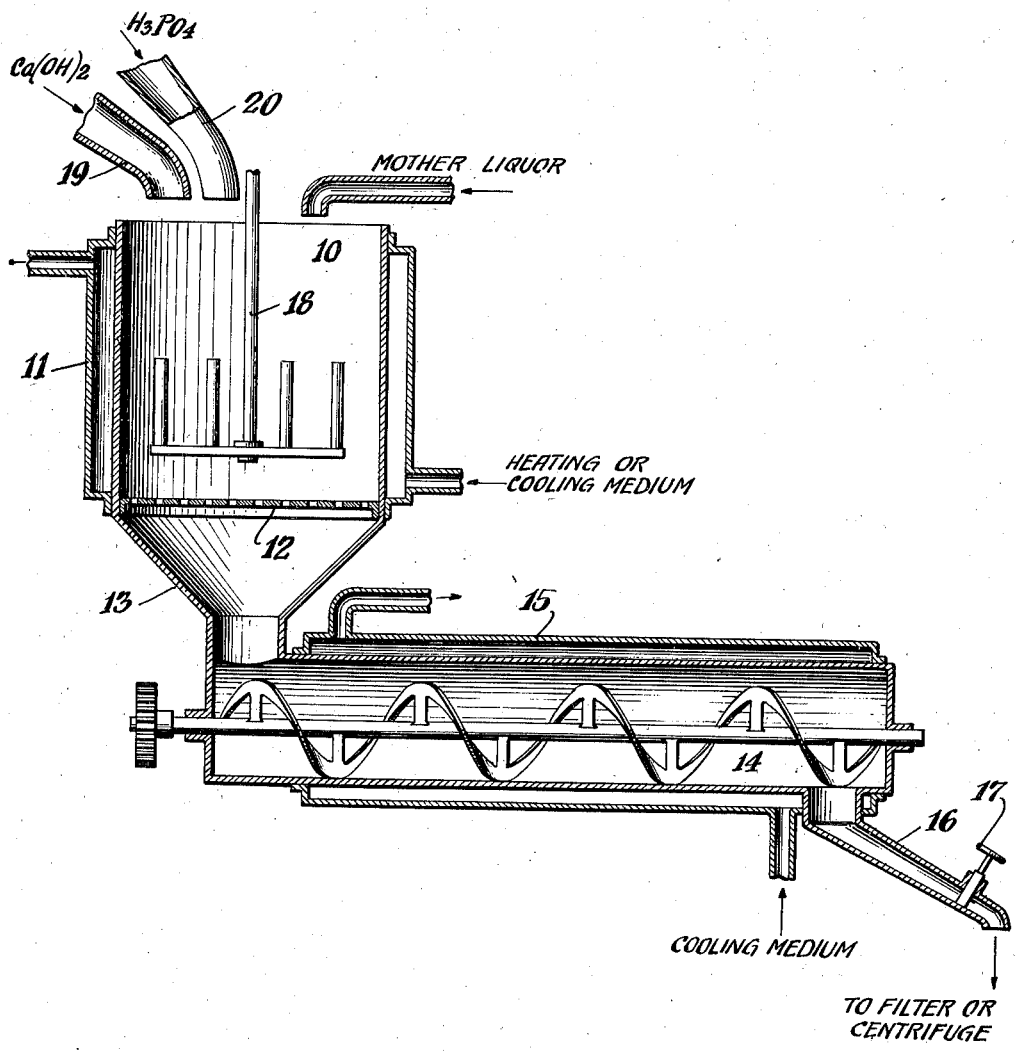

2,121,208

UNITED STATES PATENT OFFICE 2,121,208

PRODUCTION OF MONOCALCIUM PHOSPHATE

Charles H. Milligan, Westfield, N. J., assignor to The American Agricultural Chemical Company, Newark, N. J., a corporation of Delaware Application March 30, 1935, Serial No. 13,957
Renewed November 17, 1936

3 Claims. (Cl. 23—109)

This invention relates to the production of monocalcium phosphate (often called acid calcium phosphate) by reaction of phosphoric acid and a calcium compound such as lime (hydrated or unhydrated), calcium carbonate, or a more basic calcium phosphate, in proper proportions. More specifically the invention relates to the production of monocalcium phosphate of food grade, as for instance a product suitable for use as a component of baking powder, for which purpose a low content of free phosphoric acid, usually less than or not more than 0.1 per cent, is desired. The monocalcium salt of food grade is commonly made by mixing the acid and the calcium compound (finely ground), after which the precipitated phosphate is "denned", that is, stored in bins, to complete the reaction. It has also been proposed to make an acid solution of the acid phosphate, or a basic slurry of the acid phosphate, and remove the water by spray drying. Another proposal is to make a crystalline salt in the presence of excess dilute phosphoric acid and thereafter recover the solid salt by spray drying. In all of these cases the product consists of particles which are chemically heterogeneous. Under the microscope the particles are seen to be opaque, amorphous lumps, which on analysis are found to be a mixture of monocalcium phosphate, dicalcium phosphate, and phosphoric acid.

My present invention has for one of its objects the provision of the monocalcium salt in a high degree of purity and in the form of clear transparent crystals of substantially uniform size, a form which is desirable for use in baking powders and other food purposes. Another object is to provide a simple and efficient process for producing such a product on a commercial scale. Still another object is to provide for the purpose a process which can be practiced in a continuous manner. To these and other ends the invention comprises the novel apparatus, process, and product hereinafter described.

An apparatus suitable for practicing my process in the preferred manner is illustrated diagrammatically in vertical section in the accompanying drawing.

In the drawing, 10 is a reaction vessel having a jacket 11 for circulation of a heating or cooling medium as may be necessary to maintain a desirable reaction temperature, preferably about 90° to 95° C. The vessel is provided with a foraminous bottom or screen 12 above the conical outlet portion 13, which latter discharges into the end of a screw conveyer 14 having a jacket 15 for circulation of a cooling medium. At the other end the conveyer is equipped with an outlet spout 16 having a gate valve 17. In the reaction vessel 10 is a rotary agitator 18, driven by any suitable means, not shown, by which the speed and hence the vigor of the agitation can be varied as desired. The screen 12 serves to separate the zone of relatively strong agitation from the quieter zone or chamber below. In other words, it confines the relatively strong agitation to the reaction zone. The calcium hydrate (or the equivalent carbonate or unhydrated lime) and the phosphoric acid are delivered to the reaction vessel continuously by the supply pipes 19, 20, and a pipe 21 is provided for return of mother liquor.

In carrying out the process continuously and in the preferred manner a solution of phosphoric acid of about 50 per cent concentration is delivered to the reaction vessel 10 until the acid solution fills the conveyer 14 and extends up into the reaction zone to a point where the liquid will be suitably agitated by the stirrer 18. The stirrer being in operation, the selected calcium compound (CaO, CaCO$_3$, or Ca(OH)$_2$, preferably the latter) in finely divided form is fed to the reaction vessel. If necessary the calcium compound may be fed to the spout 19 by a screw conveyer, not shown, to insure a uniform supply for the reaction. At the same time phosphoric acid solution of about 75 per cent strength is supplied through spout 20, the acid and lime being regulated, preferably closely, to the theoretical requirements for production of the monocalcium phosphate. The reaction may be started at room temperature; but as it proceeds, the temperature is brought to the desired value, which, as stated, is preferably about 90° to 95° C., though good results can be obtained in respect to quality of product at temperatures down to about 80° C. and considerably above 95° C. It will be understood that the heat of the reaction will produce a rise of temperature. If the volume of the initial 50 per cent acid solution in the vessel is relatively small the heat liberated by the reaction may be sufficient to raise the temperature above the desired degree, in which case cold water may be passed through the jacket 11 to maintain the temperature; whereas with a large volume of acid in the vessel it may be necessary to heat the contents of the latter, as by passing hot water or steam through the jacket.

At first the monocalcium phosphate (CaH$_4$P$_2$O$_8$.H$_2$O)

produced by the reaction dissolves in the strong acid; but when the latter becomes saturated, small crystals of the phosphate begin to form. The crystals so produced are maintained in suspension by the agitator, and are thus kept in the mother liquor until they have grown to a size which, at the predetermined prevailing agitation, allows them to settle out through the screen 12 into the conveyer, which latter provides a zone or chamber in which, under the relatively gentle agitation therein, the crystals continue to grow and are passed to the outlet 16 from which they are discharged with the mother liquor, continuously or at suitable intervals, and are passed to a centrifuge or other suitable filtering device, not shown, where the crystals are separated from the mother liquor. To facilitate rapid grain growth in the crystallizing chamber or zone 14 the temperature in the latter is kept at about room or climatic temperature or lower by means of the cooling jacket 15.

Inasmuch as the crystals are produced in strong phosphoric acid they have some of the strong acid adhering to them, so that if dried at once after removal from the mother liquor the free acid content of the product may be too high for a given use of the product. If so, the crystals may be washed with dilute phosphoric acid, say of about 12 per cent concentration, saturated with monocalcium phosphate, before drying. In this way the free acid content of the product can be brought down to a low value, considerably less than 2 per cent. Further decrease of the free acid content, down to less than 0.1 per cent, can be obtained by mixing an equivalent amount of lime, sodium bicarbonate, or other suitable neutralizing agent, with the dried crystals.

In order to keep the acid concentration in the reaction vessel substantially constant, some or all of the mother liquor, from which the crystals are separated, is returned to the reaction vessel by means of a pump or other suitable device, not shown, adding stronger acid from time to time or evaporating the weakened mother liquor to increase its strength, as may be necessary.

The product obtained by my process is different from that produced by reacting lime and phosphoric acid in the presence of a slight excess of dilute acid. It is true that the slight amount of free acid in the latter product can be neutralized with lime, but since it was produced in dilute acid it also contains dicalcium phosphate formed by hydrolysis of some of the monocalcium salt. On neutralizing the free acid of my crystals (containing no dicalcium phosphate) some dicalcium phosphate is formed; but as there was none present before neutralization, the final product is not only low in free acid but is also low in dicalcium phosphate, the content of the latter being in general less than 2 percent calculated as $P_2O_5$. The crystals are in the form of thin plates, of quite uniform size.

The crystal size of my product can be controlled by regulating one or more of the factors on which crystal formation and crystal growth depend, such as the acid concentration of the liquor in the reaction vessel, and particularly the intensity of the agitation of the reacting materials therein, thereby controlling the settling of the crystals into the quieter zone in the conveyer. Thus with stronger agitation in the reaction zone the primary crystals must grow to larger size before they can sink, and accordingly the crystals are larger when they pass out of the reaction zone. In the conveyer, in which the crystal growth is substantially completed, with or without the formation of a small amount of new crystals, the growth is regulated by the temperature of the liquor and time during which they are kept at that temperature, the time factor being regulated by varying the speed of rotation of the conveyer, as will be readily understood.

It is to be understood that the invention is not limited to the procedure and apparatus herein specifically described and illustrated but can be carried out in other ways without departing from its spirits as defined by the following claims.

I claim—

1. In the production of crystalline monocalcium phosphate of low content of free phosphoric acid and dicalcium phosphate, establishing in a reaction zone a strong solution of phosphoric acid, introducing lime and a strong phosphoric acid solution simulataneously and in equivalent amounts into the first mentioned solution to form monocalcium phosphate in excess of the amount which the strong solution of phosphoric acid can hold in solution whereby crystals of monocalcium phosphate are produced therein, maintaining a relatively high temperature during the reaction and agitating the mass at a rate which will maintain the crystals of monocalcium phosphate in suspension in the strong phosphoric acid solution for growth to a desired size, passing the grown crystals through a crystallizing zone containing a solution of monocalcium phosphate in strong phosphoric acid maintained at a substantially lower temperature for further growth of the crystals, separating the crystals from the liquor, washing the crystals with dilute phosphoric acid, and drying the washed crystals.

2. In the production of crystalline monocalcium phosphate of low content of free phosphoric acid and dicalcium phosphate, establishing in a reaction zone a strong solution of phosphoric acid, introducing lime and a strong phosphoric acid solution simultaneously and in equivalent amounts into the first mentioned solution to form monocalcium phosphate in excess of the amount which the strong solution of phosphoric acid can hold in solution whereby crystals of monocalcium phosphate are produced therein, maintaining a temperature of not less than about 80° C. during the reaction and agitating the mass at a rate which will maintain the crystals of monocalcium phosphate in suspension in the strong phosphoric acid solution for growth to a desired size, passing the grown crystals through a crystallizing zone containing a solution of monocalcium phosphate in strong phosphoric acid maintained at a substantially lower temperature for further growth of the crystals, and separating the crystals from the liquor and drying the same.

3. In the production of crystalline monocalcium phosphate of low content of free phosphoric acid and dicalcium phosphate, establishing in a reaction zone a solution of phosphoric acid of not less than about 50 per cent concentration, introducing lime and a strong phosphoric acid solution simultaneously and in equivalent amounts into the first mentioned solution to form monocalcium phosphate in excess of the amount which the strong solution of phosphoric acid can hold in solution whereby crystals of monocalcium phosphate are produced therein, maintaining a temperature of 90 to 95° C. during the reaction and agitating the mass at a rate which will maintain the crystals of monocalcium phosphate in suspension in the strong phosphoric acid solution for growth to a desired size, passing the grown crystals through a crystallizing zone containing a solution of monocalcium phosphate in strong phosphoric acid maintained at a substantially lower temperature for further growth of the crystals, and separating the crystals from the liquor and drying the same.

CHARLES H. MILLIGAN.